July 2, 1963     T. H. JOHNSTONE     3,096,112
COINCIDENTAL DOOR LOCKING SYSTEM
Filed Nov. 14, 1961     3 Sheets-Sheet 1
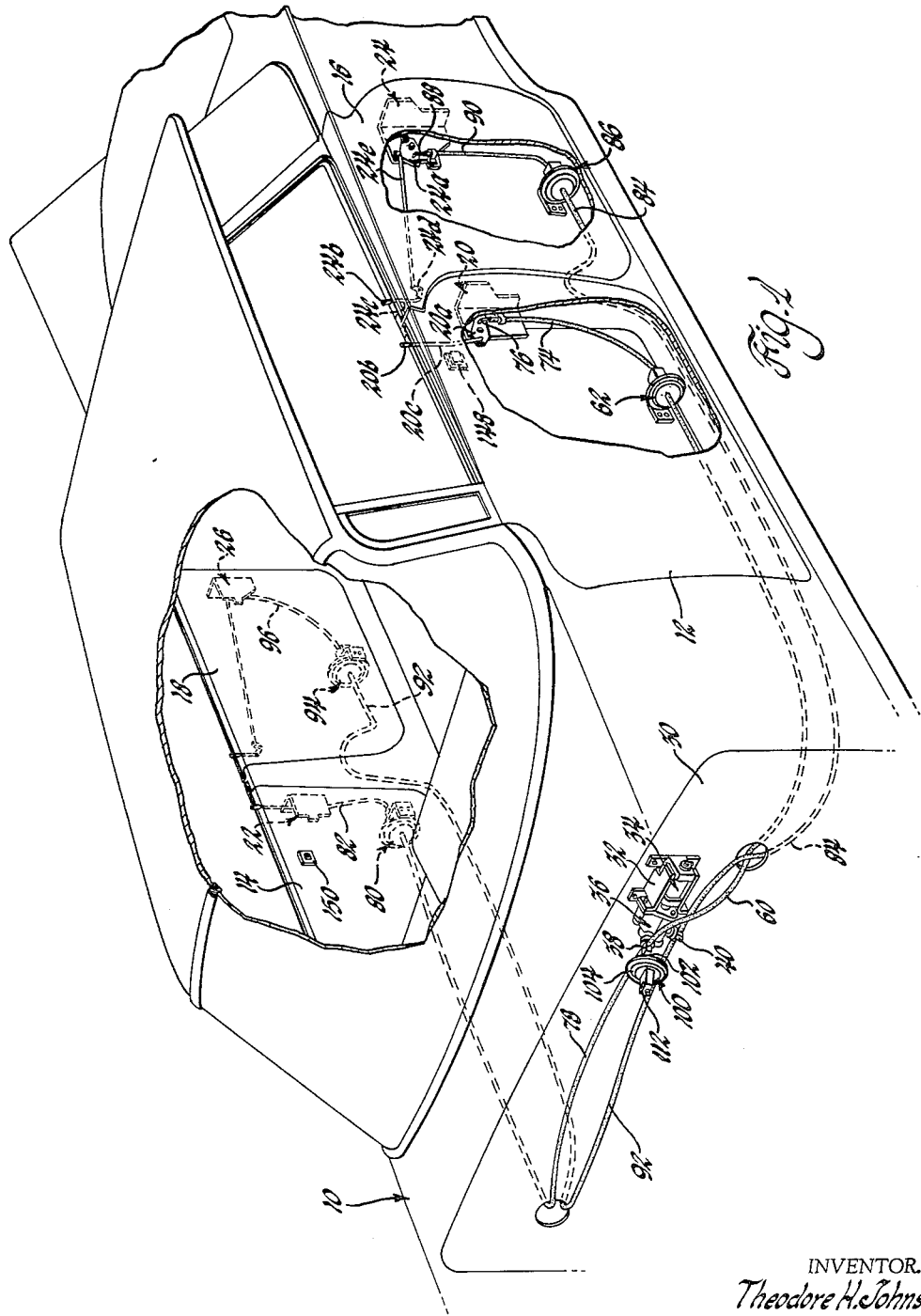
INVENTOR.
Theodore H. Johnstone
BY
W. S. Pettigrew
ATTORNEY

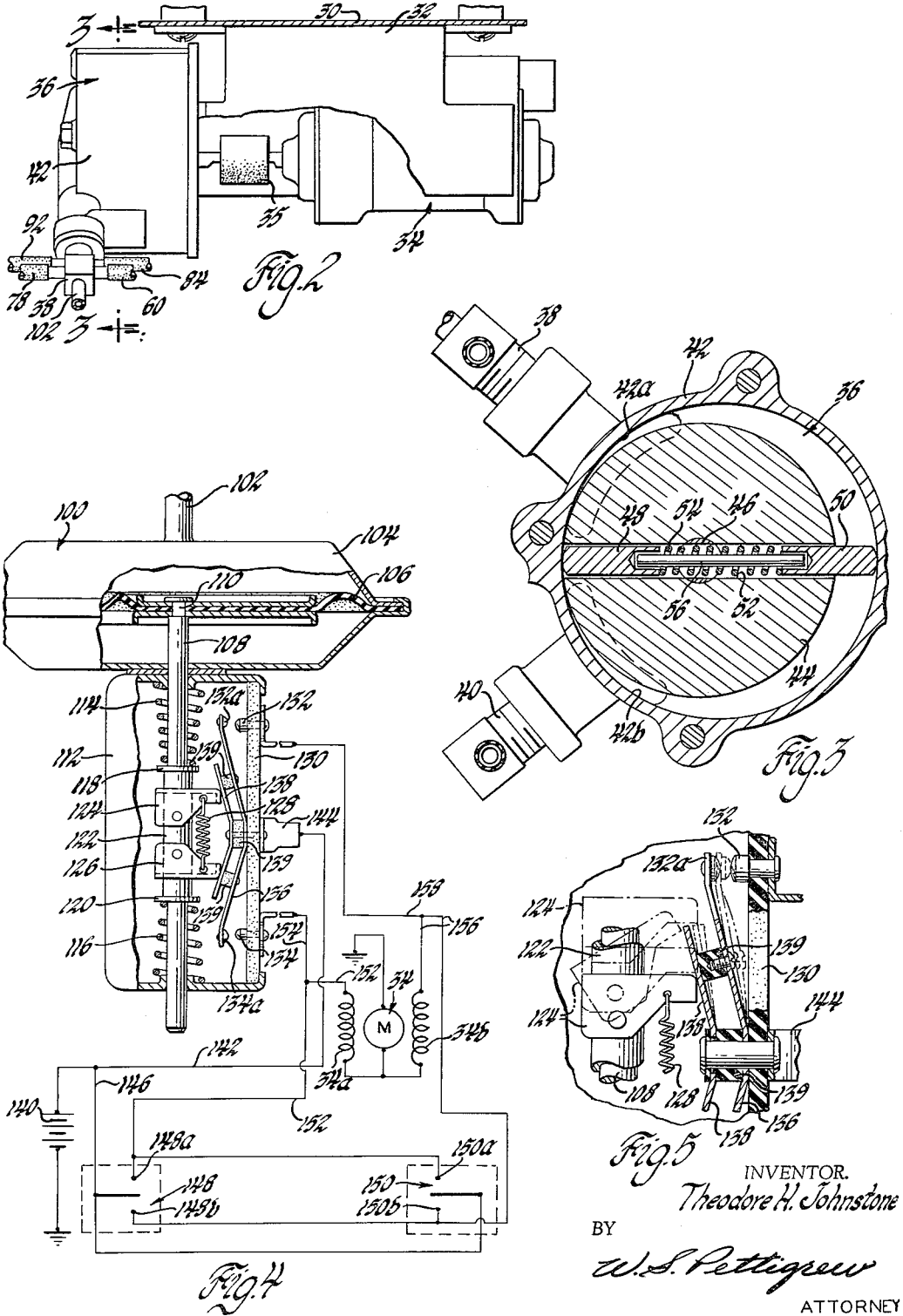

July 2, 1963 T. H. JOHNSTONE 3,096,112
COINCIDENTAL DOOR LOCKING SYSTEM
Filed Nov. 14, 1961 3 Sheets-Sheet 3

INVENTOR.
Theodore H. Johnstone
BY
W. S. Pettigrew
ATTORNEY

United States Patent Office 3,096,112
Patented July 2, 1963

3,096,112
COINCIDENTAL DOOR LOCKING SYSTEM
Theodore H. Johnstone, Lincoln Park, Mich., assignor to General Motors Corporation, Detroit, Mich., a corporation of Delaware
Filed Nov. 14, 1961, Ser. No. 152,217
11 Claims. (Cl. 292—3)

This invention relates to a coincidental door locking and unlocking system, and more particularly to an improved coincidental locking and unlocking system for vehicle doors, said system utilizing positive and negative pressure simultaneously.

One feature of the invention is that it provides an improved coincidental locking and unlocking system for vehicle doors. Another feature of the invention is that it provides a coincidental locking and unlocking system for vehicle doors in which only a single fluid conduit extends to the latch in each vehicle door. Still another feature of the invention is that it provides a coincidental door locking and unlocking system wherein fluid pressure and vacuum are utilized simultaneously to accomplish locking or unlocking. A further feature of the invention is that it provides a pneumatic coincidental locking and unlocking system having a motor driven pump which is energized through a normally open momentary contact switch, and time delay means are provided for maintaining the motor energized for a predetermined time after the operation of said switch. Other features and advantages of the invention will be apparent from the following description, having reference to the drawings in which:

FIGURE 1 is a fragmentary perspective view of an automobile incorporating the improved coincidental locking and unlocking system, parts being broken away to show underlying structure;

FIGURE 2 is an enlarged top plan view of the motor and pump;

FIGURE 3 is a further enlarged transverse section through the pump taken along the line 3—3 of FIGURE 2;

FIGURE 4 is a view illustrating one form of time delay means and including a diagrammatic representation of the energizing circuit for the system;

FIGURE 5 is an enlarged detail view of a portion of the time delay means, the parts being shown in different positions of operation;

Figure 6:
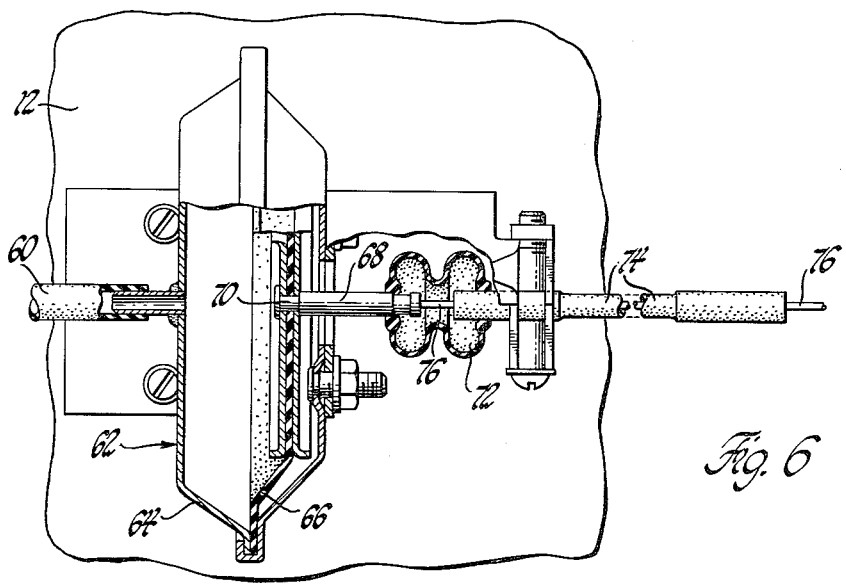
FIGURE 6 is an enlarged view partly in section of one of the couplers shown in FIGURE 1.

Coincidental door locking systems have been utilized in automobiles to provide a convenient means for locking and unlocking all of the doors simultaneously from a single operating point, as, for example, a switch or other control device accessible to the driver or passenger of the automobile. Some such systems have had certain disadvantages in that they utilized fluid pressure developed in the engine manifold to operate the system, so that they were only operable when the automobile engine was running. This disadvantage was sometimes avoided by the provision of a bulk storage tank, but this in itself resulted in disadvantages because of the storage space needed and because leakage in the system sometimes made the system unreliable when the automobile had not been in operation for a long period of time. Other locking systems had certain disadvantages in that they required two or more fluid conduits or electrical leads to be connected to each of the door latches. Even where only a single conduit has been required to operate each latch, the control means have been so complicated that the systems have not found wide commercial acceptance.

This invention provides an improved pneumatic coincidental locking and unlocking system for vehicle doors wherein positive and negative fluid pressure—i.e., pressure and vacuum—are simultaneously obtained from different ports of a reversible motor driven pump so that the system is not dependent upon operation of the automobile engine, no bulky storage tank is required, and a particular advantage is attained in that only a single conduit extends from the pump to each of the door latches. By using a reversible pump which produces pressure and vacuum simultaneously at different ports in conjunction with door latch operators wherein the front doors are locked by a force exerted in one direction and the rear doors are locked by force exerted in another direction, all four doors may simultaneously be locked by driving the pump in one direction, and all four doors may be unlocked simultaneously by driving the pump in the opposite direction. An important advantage attained is that only one fluid conduit is required for each door.

Referring now more particularly to the drawings, FIGURE 1 illustrates the over-all arrangement of the coincidental door locking system. In this figure an automobile designated generally as 10 has a left front door 12, a right front door 14, a left rear door 16, and a right rear door 18. Each of these doors is provided with a door latch, respectively designated as 20, 22, 24, and 26. Since the particular structure of these door latches is not part of this invention, and since various types of conventional and well-known latches may be used, the details of the door latch structure are not illustrated, and reference may be had to U.S. Patent 2,877,043 entitled "Rotary Bolt Door Latch" issued March 10, 1959 in the name of J. D. Leslie, for a detailed disclosure of the construction and operation of a suitable latch. Each door would normally be provided with inside and outside operating means for the latch as disclosed in Patent 2,877,043, and each latch is provided with a locking lever and a garnish molding button operator therefor. In the left front door latch 20, the locking lever is shown at 20a and the garnish molding button 20b is connected by a rod 20c to the locking lever 20a. In order to lock the door the garnish molding button 20b is depressed, pushing down on the rod 20c and swinging the locking lever 20a counterclockwise, this being similar to the locking operation for the front door latch illustrated in FIGURE 3 in Patent 2,877,043. The rear door latch 24 has a locking lever 24a which may be operated through a garnish molding button 24b that is connected to the locking lever through a rod 24c, a bellcrank 24d, and a rod 24e extending between the bellcrank 24d and the locking lever 24a. Upon depression of the garnish molding button 24b a pulling force is exerted on the rod 24e so that the locking lever 24a is swung in a counterclockwise direction. It should be noted that in the front door latch 20 locking is achieved by a pushing force on the locking lever while in the rear door latch locking is achieved by a pulling force on the locking lever. This structural arrangement of the door latches whereby the locking means in each front door is movable from unlocked position to locked position by a force exerted in one direction and the locking means in each rear door is movable from unlocked position to locked position by a force exerted in another direction is taken advantage of to provide a simple and effective coincidental door locking and unlocking system.

The automobile 10 has a conventional fire wall 30 which separates the passenger and engine compartments. Secured to this fire wall inside the engine compartment is a support bracket 32 which mounts a reversible electric motor 34 drivingly connected through a coupling 35 to a conventional reversible fluid pump 36. The motor has associated therewith control circuit means which will be described in connection with FIGURES 4 and 7, and the pump 36 has first and second outlets 38 and 40 (FIGURES 1 and 3) respectively producing pressure and vacuum alternately in accordance with the direction of operation of the pump. Referring to FIGURE 3, the pump 36 has a housing 42 formed with outlet ports 42a and 42b. A rotor 44 is eccentrically mounted in the housing 42 on a shaft 46 drivingly connected to the electric motor 34 through the coupling 35. Vanes 48 and 50 are mounted in a slot 52 in the rotor and project out of the slot 52 on opposite sides of the rotor into wiping engagement with the inner wall of the housing 42. Vanes 48 and 50 are yieldably urged apart by a coil spring 54 carried on a guide rod 56 in the slot 52 and seating at opposite ends against the respective vanes. This vane type pump produces pressure at outlet 38 and suction or vacuum at outlet 40 when the pump rotor is operated in a counterclockwise direction as the parts appear in FIGURE 3. Clockwise operation of the rotor produces vacuum at outlet 38 and pressure at outlet 40.

The pump outlet 38 is connected by a single conduit to the left front door latch 20 and is also connected by a single conduit to the right front door latch 22 so that these latches are locked and unlocked simultaneously. The pump outlet 40 is connected by a single conduit to the left rear door latch 24 and is also connected by a single conduit to the right rear door latch 26. Since the front door latches are locked by a force exerted in one direction and the rear door latches are locked by a force exerted in the opposite direction, and since forces or pressures of opposite phase are produced simultaneously at the respective pump outlets 38 and 40, all four door latches effectively are connected together for simultaneous coincidental locking and unlocking operation. For example, if it is desired to lock the doors, the pump is rotated in the proper direction to provide pressure at outlet 38 and vacuum at outlet 40. The pressure from outlet 38 is applied as a pushing force on the locking lever of each front door latch to move these locking levers from unlocked position to locked position and the vacuum from outlet 40 is applied as a pulling force on the locking levers of each rear door latch to move these locking levers from unlocked to locked position. Furthermore, it should be noted that the system cannot get out of phase if one or more of the doors is already locked, since the locking motion will have no effect on that door or doors.

A single fluid conduit 60 extends from the pump outlet 38 to the left front door 12, being connected inside the door to a diaphragm coupler device designated generally as 62 and shown in detail in FIGURE 6. This diaphragm coupler, which is of conventional construction, comprises a fluid tight housing 64 in which a flexible diaphragm 66 is mounted in a position where it may flex to the left in FIGURE 6 upon the application of vacuum through the fluid conduit 60, and it may flex to the right upon the application of pressure through the fluid conduit 60. A stud 68 is rigidly mechanically secured at 70 to the center of the diaphragm 66 and is connected at its other end to a rubber boot 72. A cable sheath 74 is connected to the other end of this boot and a flexible cable 76 extends through the sheath 74 and the boot 72, and is connected to the stud 68. The other end of the cable 76 is connected to the locking lever 20a of the door latch so that positive fluid pressure is transmitted through the cable 76 as a pushing force on the locking lever 20a while negative pressure or vacuum is transmitted through the cables as a pulling force on the locking lever.

The right front door latch 22 is connected in a similar manner to the pump outlet 38 through a single fluid conduit 78, a diaphragm coupler 80, and a cable arrangement 82. Similarly, the left rear door latch 24 is connected to the pump outlet 40 through a single fluid conduit 84, a diaphragm coupler 86, and a cable and sheath arrangement 88, 90. The right rear latch is connected to the pump outlet 40 through a single fluid conduit 92, a diaphragm coupler 94 and a cable and sheath arrangement 96. The diaphragm couplers 80, 86 and 94 are identical with the coupler 62 illustrated in FIGURE 6.

Figure 7:
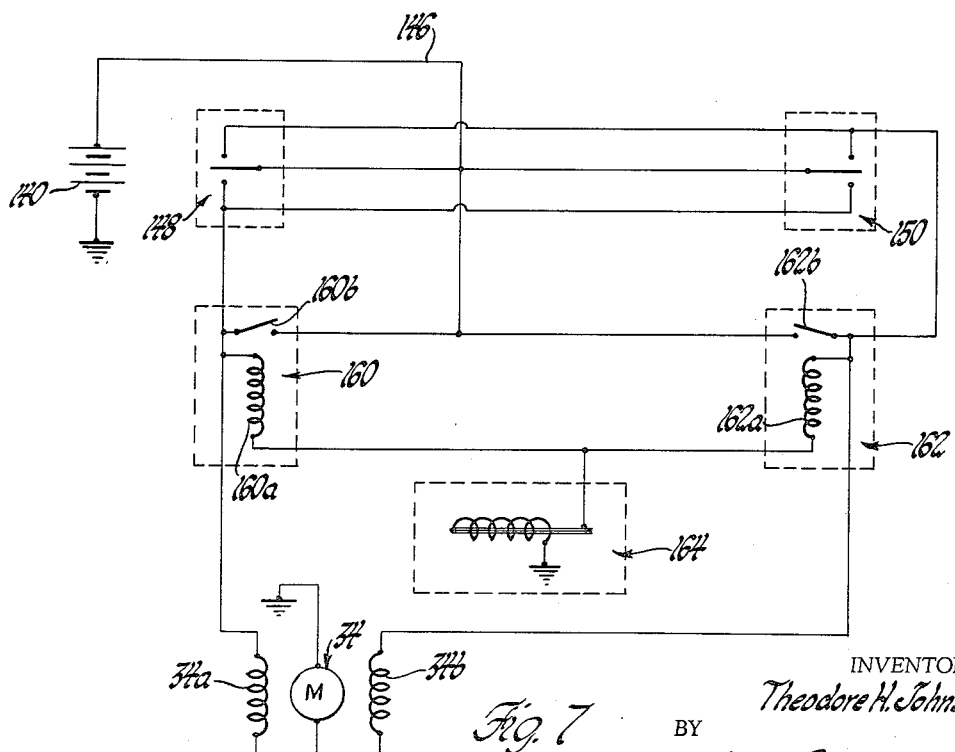
FIGURE 7 is a schematic diagram of an energizing circuit for the system, utilizing a different form of time delay means.

In order to provide a time delay to insure that the motor 34 and pump 36 are energized long enough to lock or unlock all four doors, a time delay device designated in FIGURE 1 as 100 is provided. In one form of the invention as illustrated in FIGURE 4 the time delay device is pressure sensitive, and in another form as illustrated in FIGURE 7 the time delay device is electric.

Referring to FIGURES 4 and 5, there is illustrated in detail the pressure sensitive time delay means which is shown at 100 in FIGURE 1. This device comprises a diaphragm coupler which is connected by a fluid conduit 102 with the pump outlet 38. The coupler comprises a fluid tight housing 104 which carries a flexible diaphragm 106 adapted to flex upwardly in FIGURE 4 upon the application of negative pressure or vacuum through the conduit 102 and adapted to flex downwardly in FIGURE 4 upon the application of positive pressure through the fluid conduit 102. A shaft 108 is fixedly mechanically secured at 110 to the center of the diaphragm 106 and projects out of the fluid tight housing 104 into a control box 112. The shaft 108 is surrounded by centering springs 114 and 116 which seat respectively against opposite ends of the control box 112 and against collars 118 and 120 secured to the shaft. Between these collars the shaft mounts a sleeve 122 to which are pinned vacuum and pressure cam operators 124 and 126, respectively. The vacuum cam operator 124 is mounted on the shaft in such a manner that it can pivot relative to the shaft 108 only in a counterclockwise direction from the position of FIGURE 4 in the manner shown in FIGURE 5, and the pressure cam operator 126 is mounted so that it can pivot relative to the shaft 108 only in a clockwise direction from the position shown in FIGURE 4. A light spring 128 is connected between the cam operators 124 and 126 and biases them to the position shown in FIGURE 4.

The control box 112 has one wall formed by an electrical insulating member 130 which carries switch contacts 132 and 134, and a bowed conductive leaf spring switch member 136 is mounted intermediate its ends on the wall 130 so that one of its arms can be flexed into engagement with switch contact 132 and its other arm can be flexed into engagement with switch contact 136. As shown in FIGURE 4, the diverging opposite arms of the switch member 136 respectively carry switch contacts 132a and 134a. A bowed follower member 138 is mounted on the leaf spring 136 for engagement with both of the cam operators 124, 126. Insulating spacer blocks 139 electrically isolate follower 138 from switch member 136.

FIGURE 5 illustrates details of the operation of this pressure sensitive time delay device. Upon the application of vacuum to the diaphragm 106 through the conduit 102 the diaphragm will flex so that the shaft 108 moves upwardly in FIGURE 4. During the course of this movement the vacuum cam 124 rides along the follower 138 and causes flexure of the upper arm of the leaf spring 136 to close contacts 132 and 132a. The contacts will remain closed for a period of time until the vacuum cam 124 rides past the end of the follower 138 as illustrated in broken lines in FIGURE 5. This permits the spring action of the leaf spring 136 to open the contacts 132, 132a. In a manner later to be described, these contacts break the circuit to the pump motor so that the vacuum is cut off from the diaphragm 106. Normal leakage in the system will permit the shaft 108 to move slowly back to its normal position of FIGURE 4 under the influence of the centering spring 116. Since the cam 124 is so arranged that it can pivot in one direction relative to the shaft as illustrated in FIGURE 5, this cam will pivot and will be carried back with the shaft to its normal position of FIGURE 4, the spring 128 insuring that the cam returns to its position of FIGURE 4 wherein it extends transverse to shaft 108. The time delay provided before cam 124 rides past the end of follower 138 insures that all four doors are unlocked even though the motor switch was operated only momentarily. Upon the application of pressure to diaphragm 106, a time delay is established in the manner above described, but through the cam operator 126.

Referring to FIGURE 4, a circuit for the control system is illustrated. A battery 140 (which may be the regular battery of the automobile) has one terminal connected to ground and the other terminal connected to a lead 142 which extends through a terminal 144 to the conductive leaf spring switch member 136. This last mentioned terminal of the battery also is connected by a lead 146 to the movable pole of each of two parallel connected control switches designated generally as 148 and 150. These switches, one of which may be mounted on each front door of the automobile as illustrated in FIGURE 1, are conventional normally open, momentary contact, single pole, double throw switches of the type often used to control power window circuits in automobiles, and the movable pole of each switch is spring biased to a neutral or normally open position. Each switch has a lock contact 148a and 150a, respectively, and each switch has an unlock contact 148b and 150b, respectively. The lock contacts 148a and 150a are connected by a lead 152 to one winding 34a of the motor 34, a branch lead 154 also connecting the winding 34a to the switch terminal 134 of the time delay means. The unlocking contacts 148b and 150b of the control switches are connected by a lead 156 to the other winding 34b of the reversible motor 34 and a branch lead 158 connects this winding to the switch contact 132 of the pressure sensitive time delay means.

If it is desired to lock all four doors of the automobile 10, either of the switches 148 or 150 is momentarily operated to close the circuit including one of the lock contacts 148a or 150a. Since the switches are connected in parallel, their functions are similar. Closure of the locking circuit connects the "hot" terminal of the battery 140, through the leads 146 and 152, to the winding 34a of the motor, causing the motor to operate and drive the pump 36 in a direction to produce pressure at outlet 38 and vacuum at outlet 40. These pressure and vacuum forces are applied to the locking levers of each door latch in the manner earlier described to cause the locking levers to shift from unlocked position to locked position. The time delay means 100 provides a holding circuit to insure that the motor remains energized for a period long enough to lock all four doors. As earlier described, pressure acting upon the diaphragm 106 of the time delay means will cause closure of the switch contacts 134, 134a so that the battery is now connected to the winding 34a through a parallel or holding circuit including lead 142, leaf spring 136, contacts 134a and 134, and lead 154. This holding circuit is in parallel with switches 148 and 150 and will maintain the motor energized regardless of the position of either of switches 148 or 150 until the cam 126 moves past the end of the follower 138 in the manner earlier described, and the time delay insures that all four doors are locked.

Coincidental unlocking may be achieved in the same manner through closure of a circuit including either of switch contacts 148b or 150b, so that the battery is connected to the winding 34b of the motor 34. The motor now drives the pump in the opposite direction to produce vacuum at outlet 38 and pressure at outlet 40. The time delay means is energized and will hold the motor circuit closed until the cam 124 moves off the end of the follower 138.

FIGURE 7 shows a control circuit utilizing a modified form of time delay means. In this circuit the time delay device comprises a conventional heat sensitive bimetallic switch which controls holding relays in the lock and unlock circuits. In FIGURE 7, the battery 140 has one terminal connected to ground and the other terminal connected through a lead 146 to the movable pole of each of two parallel connected, normally open, momentary contact, single pole, double throw siwtches 148 and 150. Each switch 148, 150 has one contact connected to coil 34a of motor 34 and another contact connected to coil 34b of said motor. The time delay means includes a first holding relay 160 having a coil 160a and a normally open switch 160b, both connected in the circuit of the motor winding 34a and a second holding relay 162 having a coil 162a and a normally open switch 162b, both connected in the circuit of the motor winding 34b. The coils 160a and 162a of both relays are connected to one terminal of a heat responsive, normally closed bimetallic switch 164, the other terminal of said switch being connected to ground. When one of the switches 148, 150 is momentarily closed, a direct circuit is made through the selected winding of the motor 34. At the same time, current flows through the coil of the selected one of the relays 160 or 162 and through the switch 164 to ground. Energization of the relay closes its associated switch so that a parallel holding circuit is established to maintain the motor 34 energized so long as the heat responsive switch 164 is closed. After a predetermined time lapse the switch 164 opens, dropping out the holding relay and deenergizing the motor 34.

While I have shown and described certain embodiments of my invention, it is capable of many modifications. Changes, therefore, in the construction and arrangement may be made without departing from the spirit and scope of the invention as set forth in the appended claims.

I claim:

1. In a vehicle having a plurality of doors, coincidental locking and unlocking apparatus of the character described, including: a latch for each door having locking means movable between locked and unlocked positions, including first latches with locking means movable between said positions by a force exerted in one direction and second latches with locking means movable between said positions by a force exerted in another direction; reversible fluid supply means having first and second outlets respectively producing positive and negative fluid pressure alternately in accordance with the direction of operation of said fluid supply means; means connecting the locking means of said first latches to said first outlet; and means connecting the locking means of said second latches to said second outlet.

2. In a vehicle having front and rear doors, coincidental locking and unlocking apparatus of the character described, including: a latch for each door having locking means movable between locked and unlocked positions, the locking means in each front door latch being movable between said respective positions by a force exerted in one direction and the locking means in each rear door latch being movable between said respective positions by a force exerted in another direction; reversible fluid supply means having first and second outlets respectively producing positive and negative fluid pressure alternately in accordance with the direction of operation of said fluid supply means; means connecting the locking means in each front door latch to said first outlet; and means connecting the locking means in each rear door latch to said second outlet, whereby the locking means in said front and rear doors are coincidentally moved between locked and unlocked positions upon operation of said fluid supply means.

3. In a vehicle having front and rear doors, coincidental locking and unlocking apparatus of the character described, including: a latch for each door having locking means movable between locked and unlocked positions, the locking means in each front door latch being movable between said respective positions by a force exerted in one direction and the locking means in each rear door latch being movable between said respective positions by a force exerted in the opposite direction; reversible fluid supply means having first and second outlets respectively producing pressure and vacuum alternately in acordance with the direction of operation of said fluid supply means; means including a single fluid conduit connecting the locking means in each front door latch to said first outlet; and means including a single fluid conduit connecting the locking means in each rear door latch to said second outlet, whereby the locking means in said front and rear doors are coincidentally moved between locked and unlocked positions upon operation of said fluid supply means.

4. In a vehicle having front and rear doors, coincidental locking and unlocking apparatus of the character described, including: a latch for each door having locking means movable between locked and unlocked positions, the locking means in each front door latch being movable between said respective positions by a force exerted in one direction and the locking means in each rear door latch being movable between said respective positions by a force exerted in another direction; reversible fluid pump means having first and second outlets respectively producing positive and negative fluid pressure alternately in accordance with direction of operation of said pump; circuit means controlling the operation of said pump selectively in either direction; means connecting the locking means in each front door latch to said first pump outlet; and means connecting the locking means in each rear door latch to said second pump outlet, whereby the locking means in said front and rear doors are coincidentally moved between locked and unlocked positions upon operation of said pump.

5. In a vehicle having front and rear doors, coincidental locking and unlocking apparatus of the character described, including: a latch for each door having locking means movable between locked and unlocked positions, the locking means in each front door latch being movable between said respective positions by a force exerted in one direction and the locking means in each rear door latch being movable between said respective positions by a force exerted in the opposite direction; reversible fluid pump means having first and second outlets respectively producing pressure and vacuum alternately in accordance with the direction of operation of said pump; reversible motor means connected to said pump for driving said pump; circuit means controlling the energization of said motor means selectively in either direction; means connecting the locking means in each front door latch to said first pump outlet; and means connecting the locking means in each rear door latch to said second pump outlet, whereby the locking means in said front and rear doors are coincidentally moved between locked and unlocked positions upon operation of said pump.

6. In a vehicle having front and rear doors, coincidental locking and unlocking apparatus of the character described, including: a latch for each door having locking means movable between locked and unlocked positions, the locking means in each front door latch being movable between said respective positions by a force exerted in one direction and the locking means in the rear door latch being movable between said respective positions by a force exerted in another direction; reversible fluid pump means having first and second outlets respectively producing positive and negative fluid pressure alternately in accordance with the direction of operation of said pump; reversible motor means connected to said pump for driving said pump; circuit means comprising a normally open momentary contact double throw switch controlling the energization of said motor means selectively in either direction; time delay means connected in said circuit means for maintaining said motor means energized for a predetermined time after the operation of said switch; means connecting the locking means in each front door latch to said first pump outlet; and means connecting the locking means in each rear door latch to said second pump outlet, whereby the locking means in said front and rear doors are coincidentally moved between locked and unlocked positions upon operation of said pump.

7. Apparatus of the character claimed in claim 6, wherein said time delay means comprises a mechanical pressure sensitive switch connected in said circuit means generally in parallel with said momentary contact switch.

8. Apparatus of the character claimed in claim 6, wherein said time delay means comprises heat sensitive switch means connected generally in parallel with said momentary contact switch.

9. In a vehicle having front and rear doors, coincidental locking and unlocking apparatus of the character described, including: a latch for each door having a locking lever movable between locked and unlocked positions, the locking lever in each front door latch being movable between said respective positions by a force exerted in one direction and the locking means in each rear door latch being movable in said respective positions by a force directed in another direction; reversible fluid supply means having first and second outlets respectively producing positive and negative fluid pressure alternately in accordance with the direction of operation of said fluid supply means; means connecting the locking lever in each front door latch to said first outlet, including a single fluid conduit connected at one end to said first outlet, a coupler connected to said conduit at the other end thereof and having a pressure sensitive daiphragm, and a mechanical member connected between said diaphragm and the locking lever of the latch; and means connecting the locking lever in each rear door latch to said second outlet, including a single fluid conduit connected at one end to said second outlet, a coupler connected to said conduit at the other end thereof and having a pressure sensitive diaphragm and a mechanical member connected between said diaphragm and the locking lever of the latch.

10. In a vehicle having front and rear doors, coincidental locking and unlocking apparatus of the character described, including: a latch for each door having locking means movable between locked and unlocked positions, the locking means in each front door latch being movable between said respective positions by a force exerted in one direction and the locking means in each rear door latch being movable between said respective positions by a force exerted in the opposite direction; reversible fluid pump means having first and second outlets respectively producing pressure and vacuum alternately in accordance with the direction of operation of said pump, reversible motor means connected to said pump for driving said pump; circuit means controlling the energization of said motor means selectively in either direction; means connecting the locking means in each front door latch to said first pump outlet, including a single fluid conduit connected at one end to said first outlet, a coupler connected to said conduit at the other end thereof and having a pressure sensitive diaphragm, and a flexible cable connected between said diaphragm and the locking means of the latch; and means connecting the locking means in each rear door latch to said second pump outlet, including a single fluid conduit connected at one end to said second outlet, a coupler connected to said conduit at the other end thereof, and having a pressure sensitive diaphragm, and a flexible cable connected between said diaphragm and the locking means of the latch, whereby the locking means in said front and rear doors are coincidentally moved to said locking and unlocking positions upon operation of said pump.

11. In a vehicle having front and rear doors, coincidental locking and unlocking apparatus of the character described, including: a latch for each door having a locking lever movable between locked and unlocked positions, the locking lever in each front door latch being movable between said respective positions by a force exerted in one direction and the locking lever in each rear door latch being movable between said respective positions by a force exerted in the opposite direction, reversible fluid pump means having first and second outlets respectively producing pressure and vacuum alternately in accordance with the direction of operation of said pump; reversible motor means connected to said pump for driving said pump; circuit means comprising a normally open momentary contact double throw switch controlling the energization of said motor means selectively in either direction; time delay means connected in said circuit means for maintaining said motor means energized for a predetermined time after the operation of said momentary contact switch; means including a single fluid conduit connecting the locking lever in each front door latch to said first outlet; and means including a single fluid conduit connecting the locking lever in each rear door latch to said second pump outlet, whereby the locking levers in said front and rear doors are concidentally moved between said locked and unlocked positions upon operation of said pump.

References Cited in the file of this patent
UNITED STATES PATENTS

| | | |
|---|---|---|
| 2,877,043 | Leslie | Mar. 10, 1959 |
| 3,019,848 | Garvey et al. | Feb. 6, 1962 |